(12) United States Patent
Shanahin et al.

(10) Patent No.: US 10,891,115 B2
(45) Date of Patent: Jan. 12, 2021

(54) MODEL CONFIGURATION USING PARTIAL MODEL DATA

(71) Applicant: Model N, Inc., San Mateo, CA (US)

(72) Inventors: Sergey Shanahin, Odessa (UA); Pavel Koptilin, Odessa (UA); Ketan Soni, Sunnyvale, CA (US)

(73) Assignee: MODEL N, INC., Redwood City, CA (US)

( * ) Notice: Subject to any disclaimer, the term of this patent is extended or adjusted under 35 U.S.C. 154(b) by 0 days.

(21) Appl. No.: 16/716,494

(22) Filed: Dec. 17, 2019

(65) Prior Publication Data

US 2020/0117430 A1  Apr. 16, 2020

Related U.S. Application Data

(63) Continuation of application No. 15/834,015, filed on Dec. 6, 2017, now Pat. No. 10,545,732.

(60) Provisional application No. 62/430,911, filed on Dec. 6, 2016.

(51) Int. Cl.
*G06F 9/44* (2018.01)
*G06F 8/35* (2018.01)
*G06Q 30/00* (2012.01)

(52) U.S. Cl.
CPC ............ *G06F 8/35* (2013.01); *G06Q 30/016* (2013.01)

(58) Field of Classification Search
CPC ......................................................... G06F 9/44
See application file for complete search history.

(56) References Cited

U.S. PATENT DOCUMENTS

| 7,072,841 B1 * | 7/2006 | Pednault | G06Q 50/24 |
| | | | 705/4 |
| 2003/0055612 A1 * | 3/2003 | Amakai | G06F 30/23 |
| | | | 703/1 |
| 2011/0295578 A1 * | 12/2011 | Aldrich | G06F 8/10 |
| | | | 703/6 |

* cited by examiner

*Primary Examiner* — Jae U Jeon
(74) *Attorney, Agent, or Firm* — Patent Law Works LLP

(57) ABSTRACT

As a non-limiting representative example, a system is disclosed that includes a product configurator user interface that displays a configurable model and receives configuration input for the model and a modeling platform comprising a segmenting engine networked together. The segmenting engine performs operations such as receiving configuration input and generating a first partial structured data set for evaluation by the configuration engine. The system also includes a configuration engine that communicates with the modeling platform. The modeling platform sends the first partial structured data set to the configuration engine for evaluation and receives back an evaluated instance reflecting an outcome of the configuration of the configurable model.

20 Claims, 11 Drawing Sheets

```
800
 ↘
        801
         ↘
         {
           "version": 27,
802        "uid": "Model_1u30j",
 ↘       "UI": {
             "layout": {
               "sections": [
                 {
                   ...
                 },
                 {
                   ...
                 }
               ]
             },
             ...
           },
                804
                 ↘
           "rules": [
             {
               "name": "Auto Select Rule 1",
               "type": "select",
               ...
             },
                806
                 ↘
             ...
           ],
           "result": {
             "quotes": {
               "Group2":{
                 "Option_B":true
               },
               ...
             },
808
 ↘         "objs": {
             "Account": {
               "_uid": "Account"
             },
             ...
           },
           ...
```

Figure 8A

```
820
 ↘              822
                 ↘
         "groups": {
           "Group2": {
             "allowAttributes": true,
             "allowedQty": null,
             ...
             "options": [
               {
                 "adj1": {
                   ...
                 },
                 "cost": 43.37,
                 ...
               },
               ...
             ],
             ...
           },
           "Group1": {
             ...
           }        824
         },         ↘
         ...
         "errors": {
           "values": [ ... ]
         },
         ...
         }
```

```
/*###CHUNK:UI###*/
{
  "layout":{
    "sections":[
      {
        ...
      },
      ...
    ]
  },
  "name":"Layout For a0F1a0",
  ...
}
/*###END CHUNK*/
```

904

```
/*###CHUNK:groups###*/
{
  "Group2":{
        "allowAttributes": true,
        "allowedQty": null,
        ...
        "options": [
            {
                    "adj1": {
                            ...
                    },
                    "cost": 43.37,
                    ...
            },
            ...
        ]
  },
  "Group1":{
        ...
  }
}
/*###END CHUNK*/
```

```
/*###CHUNK:objs###*/
{
  "Account":{
    "_uid":"Account"
  },
  ...
}
/*###END CHUNK*/
```

924

```
/*###CHUNK:rules###*/
[
  {
    "name":"Auto Select Rule 1",
    "type":"select",
    ...
  },
  ...
]
/*###END CHUNK*/
```

926

```
/*###CHUNK:modelInfo###*/
{
  "version":27
}
/*###END CHUNK*/
```

928

```
/*###CHUNK:errors###*/
{
  "values":[ ... ]
  ...
}
/*###END CHUNK*/
```

930

```
/*###CHUNK:result###*/
{
  "quotes":{
    "Group2":{
      "Option_B":true
    },
    ...
  },
  ...
}
/*###END CHUNK*/
```

```
function toSegmentModel( model ) {
  var result = '';
  for (var keyName in model) {
    result += getSegment(keyName,model);
  }
  return result;
} function getSegment(keyName,model){
  var result = '';
  if (model.hasOwnProperty(keyName) && typeof model[keyName]!=="function"){
    result += '/*###CHUNK:' + keyName + '###*/';
    result += JSON.stringify(model[keyName]);
    result += '/*###END CHUNK*/'
  }
  return result;
}
```

```
getModelForUI() {                                    ← 1110
  var ignoreChunks = { 'pricingInfo', 'rules', '_ruleMap', 'exprs' };
  return buildJSONFromChunks( ignoreChunks );
} getModelForEngine() {                                ← 1120
  var ignoreChunks = { 'UI' };
  return buildJSONFromChunks( ignoreChunks );
} buildJSONFromChunks() {
  var jsonStr = '';
  for(var chunk :chunksMapOfModel) {
    If ( !ignoreChunks.contains(chunk) ) {
      jsonStr +=chunk.getContent();
    }
  }
  return jsonStr;                                    1130
}
```

Figure 11

MODEL CONFIGURATION USING PARTIAL MODEL DATA

TECHNICAL FIELD

The present disclosure relates to model configuration.

BACKGROUND

Product configuration technologies are frequently used to customize complex products to meet the needs of individual customers. Models based on a model template are generally composed of a set of interrelated information including rule definitions, option groups, objects, user-interface settings, product information, error handling, pricing information, etc. However, due to the complexity of some models (which can include hundreds or thousands of options in some cases), the data comprising models can become similarly complex in composition and size, and as a result, can take noticeably long to load and transmit (which creates a non-responsive/laggy user experience).

For instance, even small updates to a large model may take significant processing time and consume vast amounts of memory because of the size of the model being updated. This processing time alone can result in performance degradation, which leads to user dissatisfaction. In additions to the delays from repeatedly processing such a large file, using the file as the basis for rendering the UI can cause slow rendering of the UI in the browser on the user's device. Even the transportation of such large models over the network between the end user's device, modeling platform, configuration engine, and/or other entities, or passing the model between modules on the server side, can cause substantial delays that frustrate users. For example, even a few seconds delay in responsiveness may frustrate sales groups and, over time, add up to significant productivity and revenue losses for a company. Where elements of the product configurator interface directly with a customer, delays in product configuration may cause a drop in sales conversions.

SUMMARY

According to one aspect of the subject matter described herein, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system having a product configurator user interface that displays a configurable model and receives configuration input configuring the configurable model. Further, the system includes a modeling platform including a segmenting engine, the modeling platform being coupled via a network to the product configurator user interface, the segmenting engine of the modeling platform being executable to perform operations. The operations include receiving, from the product configurator user interface, the configuration input configuring one or more aspects of the configurable model and generating a first partial structured data set for evaluation by the configuration engine based on the configuration input and a segmented data model associated with the configurable model, the first partial structured data set including a first subset of segments from the segmented data model.

The system can further include a configuration engine coupled for communication with the modeling platform, the modeling platform being executable to perform operations including sending the first partial structured data set to the configuration engine for evaluation and receiving an evaluated instance of the first partial structured data set from the configuration engine, the evaluated instance of the first partial structured data set reflecting an outcome of the configuration of the one or more aspects of the configurable model.

Further embodiments include corresponding methods, computer systems, apparatuses, and computer programs recorded on one or more computer storage devices.

Some embodiments may include one or more of the following features; that the operations of the segmenting engine include generating a second partial structured data set based on the segmented data model and the outcome of the configuration received from the configuration engine; sending the second partial structured data set to the product configurator user interface; that the second partial structured data set includes a second subset of segments from the segmented data model that are different from the first subset of segments; that the product configurator user interface displays the second partial structured data set and highlights the outcome based on the displayed second partial structured data set; that the outcome includes one or more results produced by an evaluation of the configuration of the configurable model by the configuration engine and one or more errors produced by the evaluation of the configuration of the configurable model by the configuration engine; that the second partial structured data set includes a facts segment including the configuration input; a results segment includes the one or more results and the one or more errors and a subset of other segments from the segmented data model; that operations of the segmenting engine further include parsing an error segment from the evaluated instance of the first partial structured data set; that the error segment reflects one or more errors identified by the configuration engine during an evaluation of the first partial structured data set; that the modeling platform highlights one or more errors described by the error segment; that the second partial structured data set includes the error segment; that the modeling platform is configured to determine the first partial structured data set and the second partial structured data set based on an intended recipient; that, responsive to the intended recipient being the product configurator user interface, the second subset of segments from the segmented data model includes segments required by the product configurator user interface to render the configurable model; that, responsive to the intended recipient being the configuration engine, the first subset of segments from the segmented data model includes segments required by the configuration engine to evaluate the configurable model; that, responsive to the intended recipient being a customer relationship management (CRM) platform or system, a third partial structured data set includes at least one segment required by the CRM platform; that operations of the configuration engine further include receiving the first partial structured data set for evaluation, evaluating the first partial structured data set, and sending an evaluated instance of the first partial structured data set; that the evaluated instance of the first partial structured data set reflects an outcome of the configuration of the one or more aspects of the configurable model.

Some further embodiments of the described techniques may include hardware, a method or process, or computer software on a computer-accessible medium.

It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 8A and 8B depict example code of a product configuration model.

FIGS. 9A and 9B depict example chunks segmented from the product configuration model of FIGS. 8A and 8B.

FIG. 10 is a listing of pseudo code for segmenting functionality configured to create chunks segmented from a product configuration model.

FIG. 11 is a listing of pseudo code for working with the chunks in the segmented product configuration model.

DETAILED DESCRIPTION

In general, a product configurator may include various networked systems, discussed below, to provide a seamless user experience in configuring products with models based on model templates. For instance, a user interface may be provided in a browser that is communicatively coupled to a sales cloud service. The sales cloud service might be an interface for sales professionals in general such as a CRM platform, e.g., Salesforce™. The sales cloud service may include a programmable interface and mechanism to communicatively connect to networked configuration engine. In some cases, the configuration engine may run in a cloud environment such as Amazon Web Services. For instance, one or more Node JS instances, along with a load balancer, may provide the configuration engine functionality. However, other software structures and/or configurations are also contemplated.

A model may be stored in a cloud computing service and passed from configuration engine to the sales cloud service, and from the sales cloud service to the browser application of a sales professional. Given the network connections between the various components and the computing power of the various components, passing and processing the model between the various components may result in a less responsive user experience. For example, in some embodiments, the configuration engine may be called for every quote line when a user manipulates data in the quote or quote line in order to re-validate the configuration. The system may then either continuously validate after changes to any fact (e.g., prices, quantity, etc.) after a quote line has been committed, or the system may validate changes on request. Since, in typical cases, there are many configured quote lines in the quote and the models of each product in such quote lines can be fairly large and complex, this often results in operations that are computationally costly and bog down and/or crash the browser application. These operations are often also unnecessarily bandwidth intense.

It should be appreciated that, in some embodiments, a product configuration architecture may include more components or fewer components. For example, in some embodiments, the configuration engine and sales service may be combined into a single service, and the model may be passed from the single service to the browser directly. In another example, some embodiments may not require the computing power of multiple configuration instances and therefore may not require a load balancer.

Figure 1:
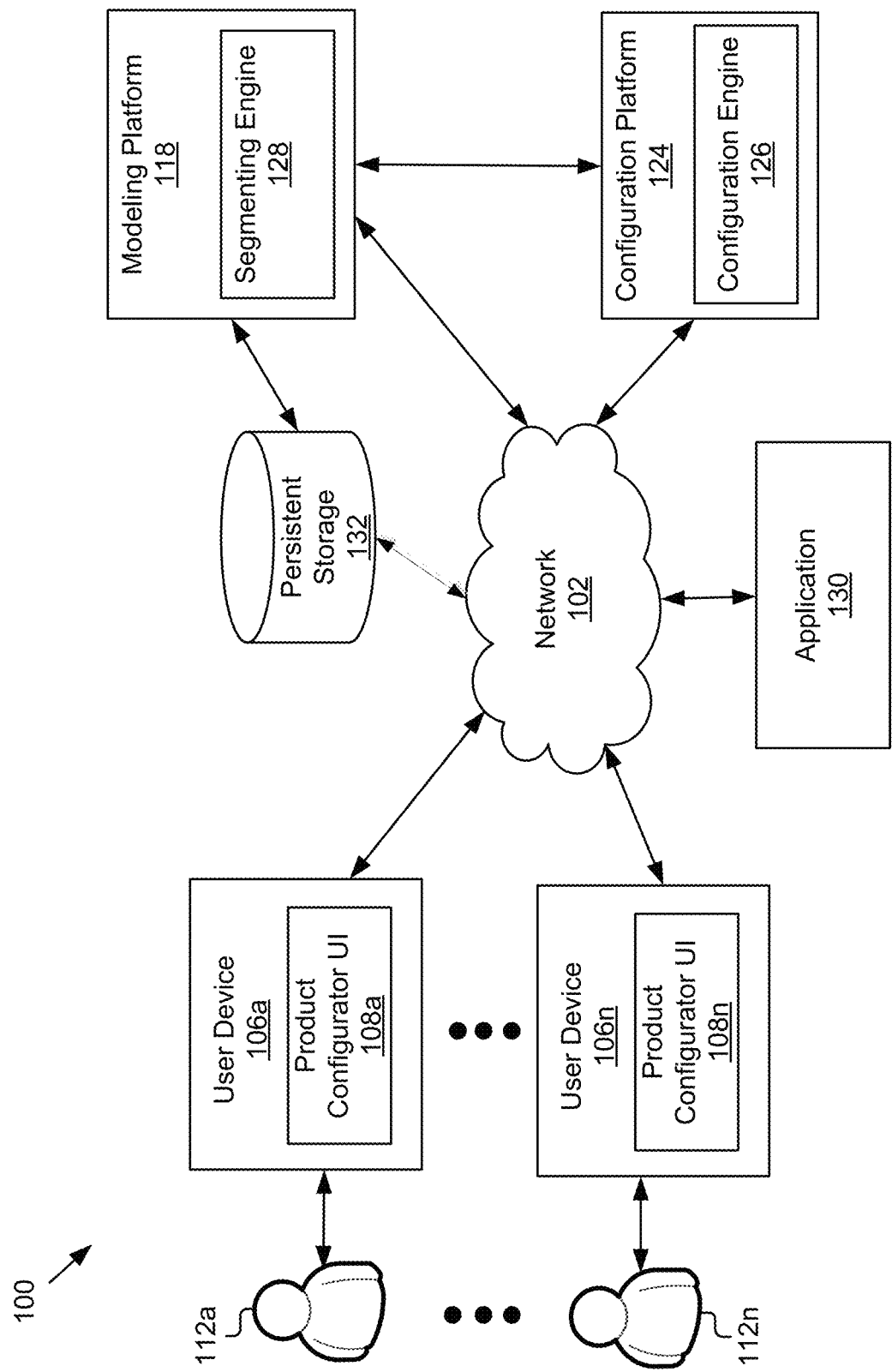
FIG. 1 is a block diagram illustrating an example model configuration system.

FIG. 1 is a block diagram illustrating an example model configuration system 100. The illustrated system 100 includes user devices 106a . . . 106n and a modeling platform 118, which are communicatively coupled via a network 102 for interaction with one another. For example, the user devices 106a . . . 106n may be respectively communicatively coupled to the network 102 and may be accessible by users 112a . . . 112n (also referred to individually and collectively as 112). As depicted in the figure, the system 100 includes a modeling platform 118 and a configuration platform 124. The modeling platform 118 may be communicatively coupled to the network 102, the configuration platform 124 may be communicatively coupled to the network 102, and the modeling platform 118 and the configuration platform 124 may be communicatively coupled to one another in some cases. Further, the chunking or segmenting engine 128 may be communicatively coupled to the network 102, and the modeling platform 118, and the configuration platform 124. The use of the nomenclature "a" and "n" in the reference numbers indicates that the system 100 may include any number of those elements having that nomenclature.

It should be understood that the system 100 illustrated in FIG. 1 is representative of an example system for product configuration and that a variety of different system environments and configurations are contemplated and are within the scope of the present disclosure. For instance, some implementations may include additional or fewer computing devices, services, and/or networks, and may implement various functionality user or configuration system-side. Further, various entities of the system may be integrated into to a single computing device or system or additional computing devices or systems, etc.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user devices 106a . . . 106n (also referred to individually and collectively as 106) are computing devices having data processing and communication capabilities. In some implementations, a user device 106 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The user devices 106a . . . 106n may couple to and communicate with one another and the other entities of the system 100 via the network 102 using a wireless and/or wired connection.

Examples of user devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more user devices 106 are depicted in FIG. 1, the system 100 may include any number of user devices 106. In addition, the user devices 106a . . . 106n may be the same or different types of computing devices.

In the depicted implementation, the user devices 106a . . . 106n respectively contain instances 108a . . . 108n of a product configurator user interface (UI) (also referred to individually and collectively as 108). The product configurator UI 108 may be storable in a memory (not shown) and executable by a processor (not shown) of a user device 106. The product configurator UI 108 may include a browser application that can retrieve and/or process information hosted by one or more entities of the system 100 (for example, the modeling platform 118 and/or the configuration platform 124) and can present the information on a display device (not shown) on the user device 106.

The modeling platform 118 may include one or more computing devices having data processing, storing, and communication capabilities. For example, the modeling platform 118 and/or its constituent components like the segmenting engine 128, the modeling platform 118 and/or the configuration platform 124 may include one or more hardware servers, virtual servers, server arrays, storage devices and/or systems, etc., which may be networked via the network 102 for cooperation and communication with one another. In some implementations, the modeling platform 118, including the segmenting engine 128, the modeling platform 118, and/or the configuration platform 124, may be implemented using cloud-based architectures where one or more computer functions are performed by remote computing systems and devices at the request of a local computer device, although further implementations are also contemplated where the segmenting engine 128, the modeling platform 118, and/or the configuration platform 124 are implemented using local hardware and/or software resources or a combination of the foregoing. Additional structure, acts, and/or functionality of the segmenting engine 128, the modeling platform 118, and/or the configuration platform 124 are described in further detail elsewhere herein.

The system 100 may also include additional integrating subsystems. An enterprise resource planning (ERP) system (not shown) may be included as part of the system 100. As one example, the ERP system may integrate with the modeling platform 118 to provide quotes based on available inventory. An application 130 such as a CRM system may also be included as part of the system 100. For instance, the CRM system may relate a particular customer, department, or contact with a specific set products or model templates. In some embodiments, the system 100 may include persistent storage 132 at least for saving a product configuration model.

Figure 2:
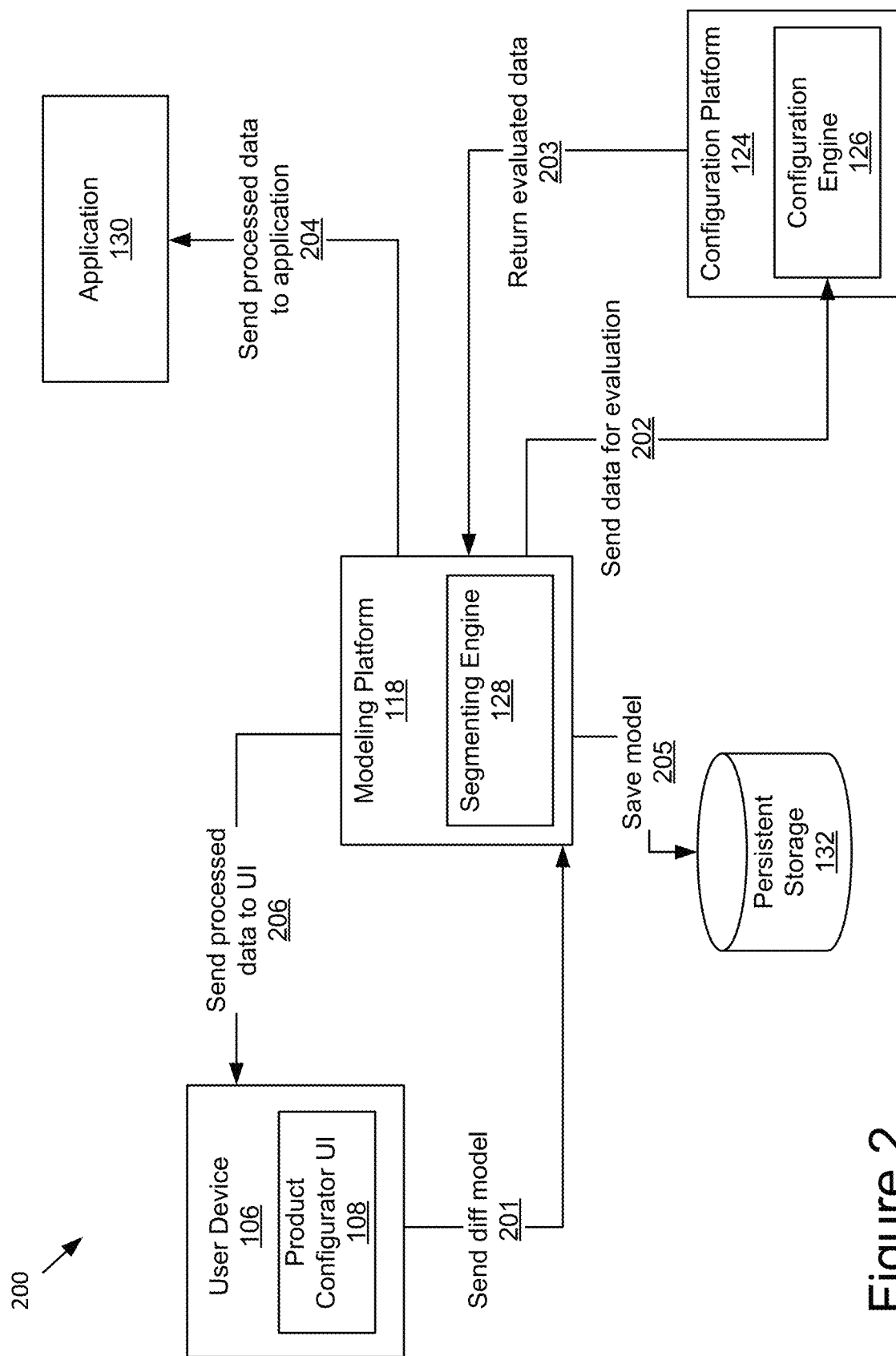
FIG. 2 is a block diagram illustrating an example of a cycle in a product configuration process.

FIG. 2 is a diagram illustrating an example flow, according to some embodiments, of a product configuration process using partial models. The flow is generally cyclical, although other variations are possible. Starting at the point where a user has provided configuration inputs via a graphical user interface to configure the model as presented on a display of a user device 106 by the product configurator UI 108, and submitted those options, the product configurator UI 108 sends the changes (e.g., updated options, etc.) in operation 201 send a partial model (e.g., a partial data set representing the changes to the model, such as the model diff) to the modeling platform 118. The modeling platform 118 integrates the changed options into the configuration model and uses the segmenting engine 128 to segment the configuration model into a segmented data model, assemble an appropriate set of chunks from the segmented data model into a set of partial structured data, in this case, a partial configuration engine model, to send to the configuration engine 126 for evaluation in operation 202 send data for evaluation.

After evaluation, the configuration engine returns the evaluated instance of the configuration engine partial model, the outcome of the evaluation, to the modeling platform 118 in operation 203 return evaluated data. The modeling platform 118 may process the evaluated instance and send some of the processed data to an application 130, such as a CRM, in operation 204 send processed data to application. In some embodiments, the data sent to the application 130 includes error information segmented from the evaluated instance returned from the configuration engine 126 in operation 203. In some embodiments, the modeling platform 118 saves the full model to the persistent storage 132 in operation 205 save full model. In some embodiments, the modeling platform 118 may store the changes iteratively to persistent storage instead of writing the full model to storage each time. Other variations are also contemplated. In operation 206 send processed data to UI, the modeling platform sends the processed data to the product configurator UI 108 on the user device 106. The product configurator UI 108 can update the model being configured by updating the graphical user interface with the outcome of the evaluation. In response, the user may choose further options and/or make further changes or additions before submitting the changes and beginning the cycle anew at operation 201 send diff model. In some embodiments, the configurable model (the full model) is updated in memory by the modeling platform, such as but not limited to during or between operations 201, 202, 203,206, etc.

Figure 3:
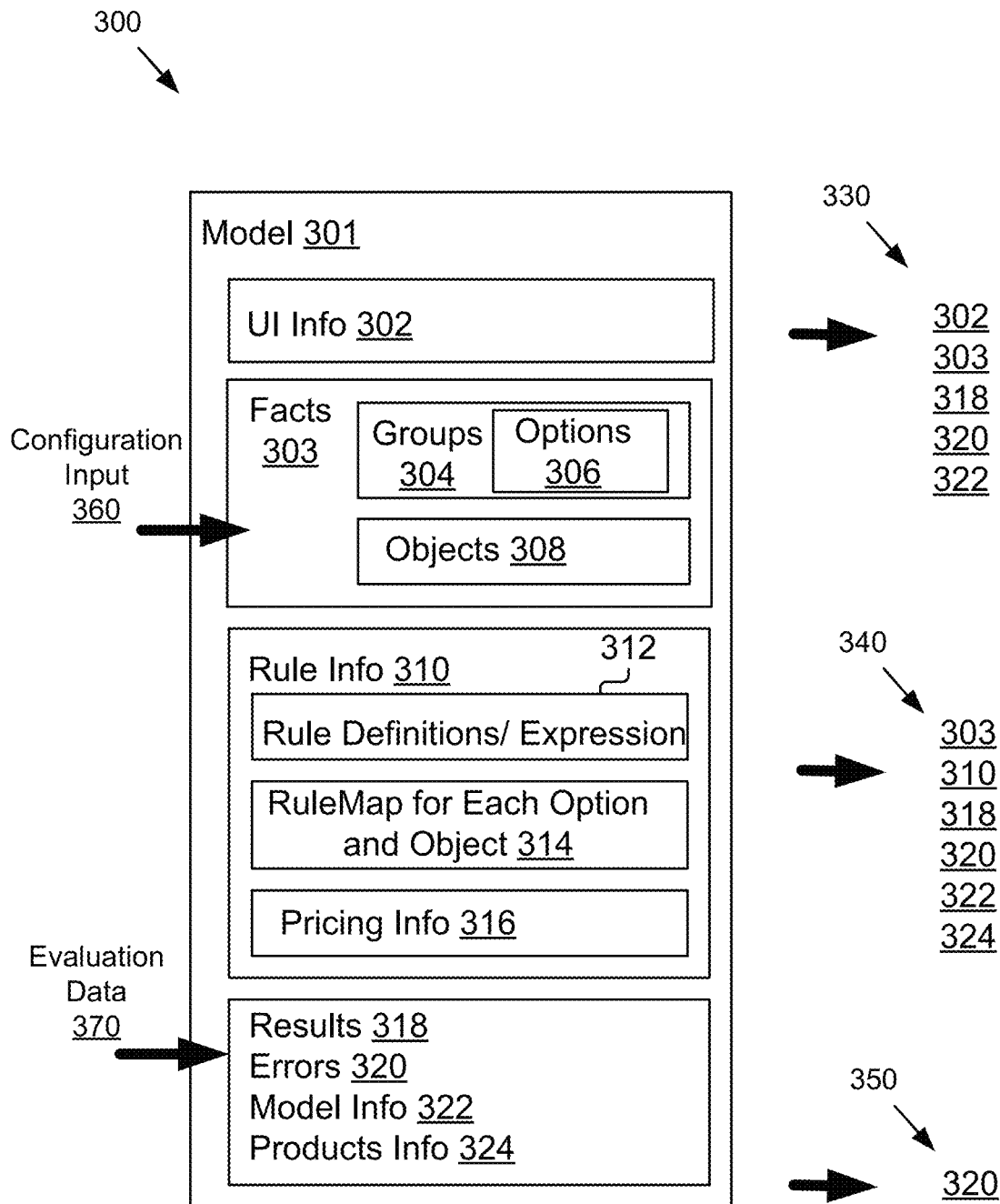
FIG. 3 is a block diagram illustrating an example partial model structure.

FIG. 3 is a block diagram, which includes an example model structure 300 and example UI partial model 330, an example configuration engine partial model 340 and an example application partial model 350. The models 330, 340, 350, etc., may be stored and transmitted in JSON, XML, or other structured data format. It should be understood that any suitable data format is applicable, whether compressed, uncompressed, compiled or uncompiled, etc.

In some embodiments, the model 301 structure may include UI information 302, facts 303, rule information 310, and other information such as results 318, errors 320, model information 322, and products information 324. The facts section may include groups 304 and objects 308, and the groups may have a subsection for options 306. The rule information section may include subsections for rule definitions and expressions 312, along with subsections for rulemaps for each options and object 314, and pricing information 316. Many of these terms, and other terms in this disclosure are described in U.S. patent application Ser. No. 14/069,362, entitled "Simplified Product Configuration Using Table-Based Rules, Rule Conflict Resolution Through Voting, and Efficient Model Compilation," filed on Oct. 31, 2013, the entire contents of which are incorporated herein by reference.

In some embodiments, the UI partial model 330 includes chunks segmented from the model 301, including, a UI information segment based on the UI information 302, a facts segment based on the facts 303, a results segment based on the results 318, an error segment based on the errors 320, and a model information segment based on the model information 322. In some embodiments, each of these chunks is considered a user interface-related segment, although it should be understood that the UI is one example of a role and the segments included in a partial mode may be any set of suitable segments that are related to that role as discussed elsewhere herein.

In some embodiments, the configuration engine partial model 340 includes chunks segmented from the model 301, including, a facts segment based on facts 303, a rule information segment based on the rule information 310, a results segment based on results 318, an error segment based on the errors 320, a model information segment based on the model information 322, and a products information segment based on the products information 324. In contrast to the above UI-related role, each of these chunks is considered a configuration engine-related segment as they relate to the processing performed thereby.

In some embodiments, the application partial model 350 includes at least one chunk segmented from the model 301, including, an error segment based on the errors 320.

In some embodiments, configuration input 360 coming from the product configurator UI 108 is used to update the facts 303 in the model 301.

In some embodiments, evaluation data 370 returned from the configuration engine 126 may be used to update some combination of the results 318, errors 320, model information 322, and products information 324 in the model 301.

Figure 4:
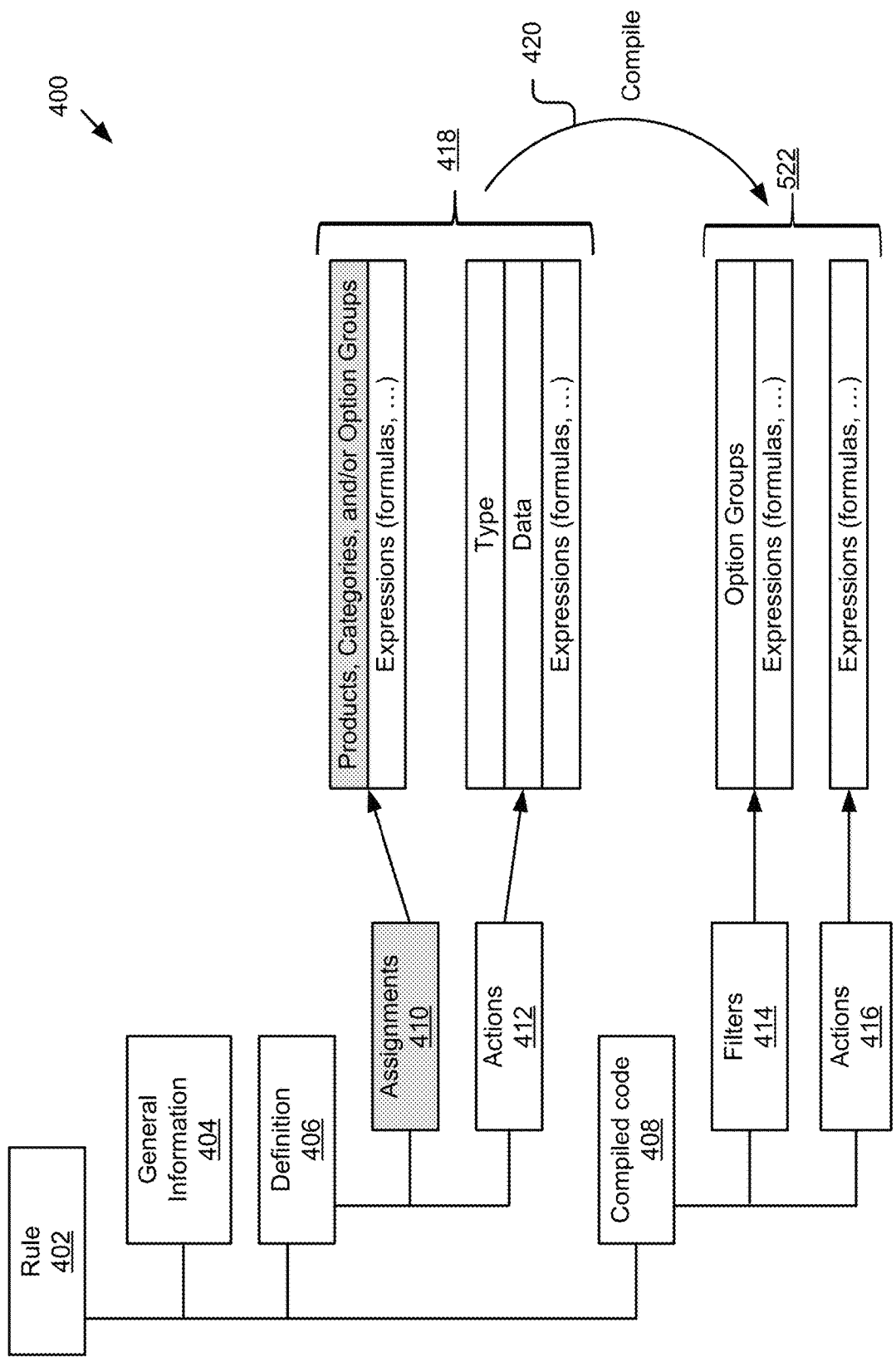
FIG. 4 is a block diagram illustrating an example architecture for a rule used in a model.

FIG. 4 is a block diagram illustrating an example architecture 400 for a rule 402 used in a model. As depicted, the rule 402 may include at least general information 404, a definition 406, and a compiled code 408. The general information 404 may include information about the rule, such as, but not limited to, its name, description, id, lifecycle status, effective dates, creator, revision history, etc. The definition 406 may include a simplified representational view of the rule, and that can be used to describe the rule in a user interface generateable by the technology described herein to view and/or edit the rule. The definition 406 may represent a structured way to create a rule based on one or more elements including predefined assignments 410 and actions 412.

The assignments 410 may be defined by the rule 402 and may determine when a rule is executed. The assignments 410 can associate the rule 402 with various types of objects including, but not limited to, products, categories, and option groups as depicted in association with reference number 418. Rule assignments 410 can be user defined (e.g., be explicit rule assignments) and/or automatically defined by system (e.g., be implicit rule assignments). Rule assignments 410 and/or actions 412 may be defined using one or more expressions, which may include various values, functions, variables, etc. In some implementations, rules can be assigned to various types of objects including attributes, products, and option groups, etc. If a rule has no assignment, the modeling engine 420 may determine one or more option groups it could impact based on the action. For instance, compatibility between attr1 and attr2 action could create an implicit assignment with option groups that have a tie to one of these attributes.

Actions 412 may determine what the rule does when it is executed. Actions 412 can be categorized into different action types (also referred to as rule types). For each action type, the technology may provide users with an associated user interface for defining that rule using a structured data model (e.g., for storage and UI behavior) that may be compiled into compiled code 408 and interpreted. Example action or rule types include compatibility, conditionally required, conditionality visible, default selected options, option entitlement, price adjustment, raw, etc.

The assignments 410 and actions 412 may be compiled into corresponding filters 414 and actions 416. The filters 414 of a rule 402 may determine the conditions for executing a rule and the actions 416 of a rule may determine what the rule 402 does when it is executed. Within a rule, one or more actions can be added by the user (e.g., actions 412) or autonomously by the modeling platform 118 in cooperation with the configuration engine 126. As depicted, a filter 414 may include one or more option group and may trigger the execution of the rule 402 if the option group has changed. The filter 414 may also include an expression (e.g., Boolean expression) that determines whether the rule should be executed.

Figure 5:
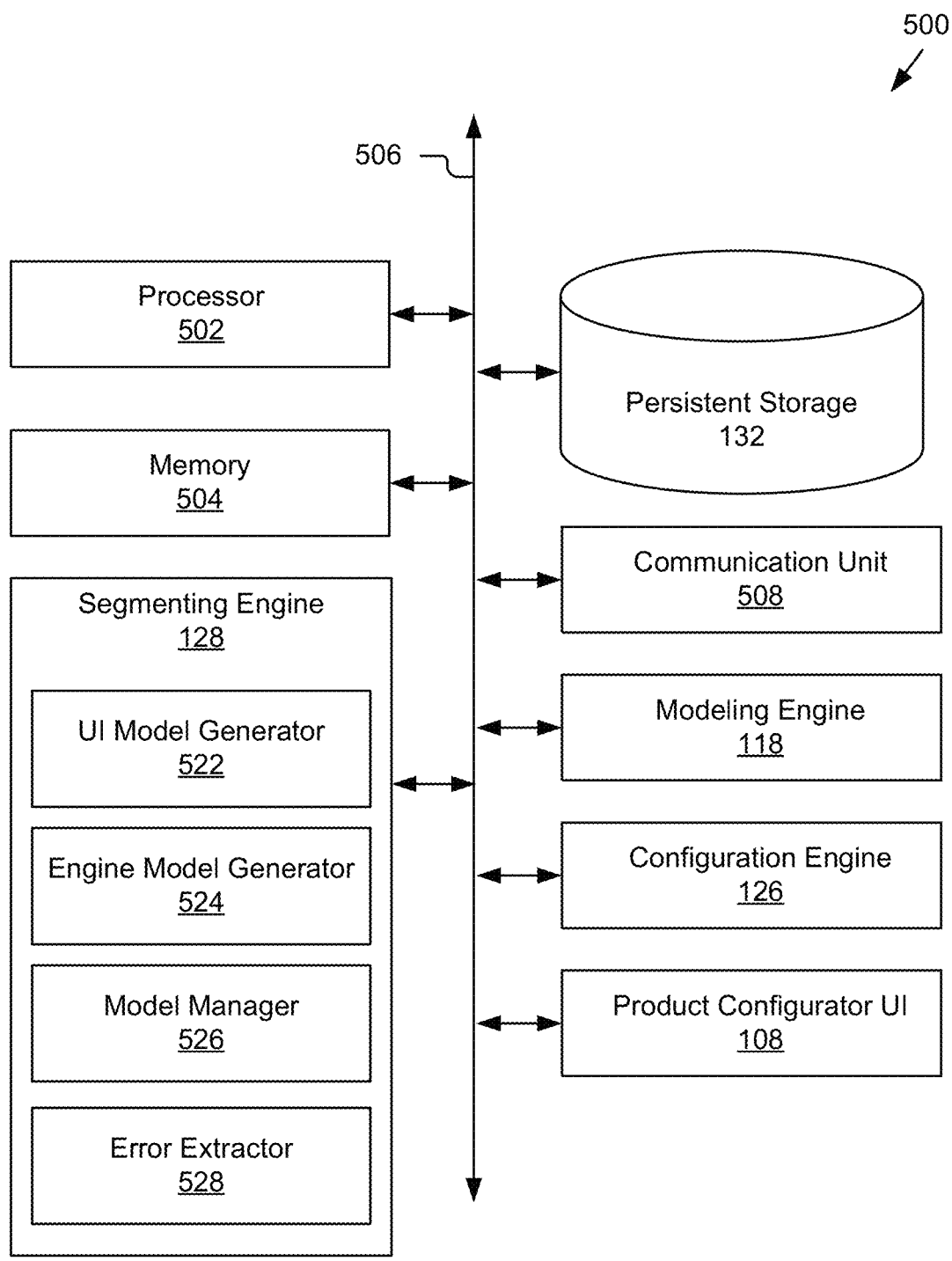
FIG. 5 is a block diagram of an example computing device for product configuration using partial model data.

FIG. 5 is a block diagram of an example computing device 500 for product configuration using partial model data. The computing device 500 may be representative of a computing device that can comprise the modeling platform 118 or the user device 106. As depicted, the computing device 500 may include a processor 502, a memory 504, a communication unit 508, a persistent storage 132, and one or more of a configuration engine 126, a modeling platform 118, the product configurator UI 108, and the segmenting engine 128, which may be communicatively coupled by a communication bus 506.

Depending upon the configuration, the computing device 500 may include differing components. For instance, in a product configurator implementation, the computing device 500 may include an instance of the segmenting engine 128, the modeling platform 118, and/or the configuration engine 126. In a user device configuration, the computing device 500 may include the product configurator UI 108. In further implementations, a first computing device 500 representative of the modeling platform 118 may include the modeling platform 118, a second computing device 500, representative of the configuration platform 124, may include the configuration engine 126, a third computing device 500 may include the segmenting engine 128, and a plurality of fourth computing devices 500 representative of the user devices 106a ... 106n may respectively include the product configurator UI 108a ... 108n. In some cases, components of the segmenting engine 128 (e.g., UI model generator 522, engine model generator 524, model manager 526, and error extractor 528) may be executed on a computing device alongside the modeling platform 118 and the configuration platform 124. In further cases, the segmenting engine 128 may be incorporated into the modeling platform 118, the configuration engine 126, or another suitable component. It should be understood that the above configurations are provided by way of example and numerous further configurations are contemplated and possible. Together, the UI model generator 522 and engine model generator 524 comprise a role-based partial model generator. Any of these components may be implemented in a variety of web platforms, using a suitable hardware, formatting, and programming language, such as, but not limited to, using Apex™ on Salesforce.com or using C# on Azure.

By way of example and not limitation, instances of the modeling platform 118, the segmenting engine 128 and/or its constituent components, the configuration engine 126 and/or its constituent components, and/or the product configurator UI and/or its constituent components, may transmit HTTP messages (e.g., requests, responses, etc.) to one another over TCP/IP connections. The payload of a message may, for instance, include the partial models described herein, along with any other requisite data for the recipient to perform its desired functionality. In some cases, the functionality of the segmenting engine 128 and/or its constituent components, the configuration engine 126 and/or its constituent components, the CRM, and/or other applications (e.g., the product configurator UI 108), may be accessed via application programming interfaces (APIs) exposed by those respective components. For example, the product configurator UI 108 may send a request to an API of the modeling platform 118 requesting evaluation of the changes to a model and providing the partial model comprising the changes, the modeling platform 118 may access functions of the segmenting engine 128 through an API surfaced thereby to generate the partial model for the configuration engine 126, and the modeling platform 118 may send a request to an API of the configuration engine 126 requesting the configuration engine 126 to evaluate changes to a model using the generated partial model, and so forth.

The services 204 may comprise distributed services (e.g., software-as-a-service (SAAS), infrastructure-as-a-service (IAAS), etc.) that the monitoring platform 108 can integrate with via application programming interfaces (APIs) or other suitable methods to access various functionality. Examples of such services 204 include human resource management services, infrastructure monitoring services (e.g., access point configuration and maintenance, IT security infrastructure, facility security monitoring services, etc.), etc. More particularly, the network access service 204-1 may comprise a SAAS service providing access to access point data from access points installed on premises and maintained by the SAAS service provider; and the security service 204-2 may comprise a facility monitoring SAAS service that collects sensor data from sensors 102 installed around a premises, although it should be understood that other services are possible and contemplated.

The processor 502 may execute software instructions by performing various input/output, logical, and/or mathematical operations. The processor 502 may have various computing architectures to process data signals including, for example, a complex instruction set computer (CISC) architecture, a reduced instruction set computer (RISC) architecture, and/or an architecture implementing a combination of instruction sets. The processor 502 may be physical and/or virtual and may include a single core or plurality of processing units and/or cores. In some implementations, the processor 502 may be capable of generating and providing electronic display signals to a display device (not shown), supporting the display of images, capturing and transmitting images, performing complex tasks including various types of feature extraction and sampling, etc. In some implementations, the processor 502 may be coupled to the memory 504 via the bus 506 to access data and instructions therefrom and store data therein. The bus 506 may couple the processor 502 to the other components of the computing device 500 including, for example, the memory 504, communication unit 508, and the persistent storage 132.

The memory 504 may store and provide access to data to the other components of the computing device 500. In some implementations, the memory 504 may store logic and/or data that may be executed by the processor 502. The memory 504 is also capable of storing other instructions and data, including, for example, an operating system, hardware drivers, other software applications, databases, etc. The memory 504 may be coupled to the bus 506 for communication with the processor 502 and the other components of the computing device 500.

The memory 504 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 502. For instance, the memory 504 may store instructions (e.g., executable software) comprising the modeling platform 118, the configuration engine 126, the segmenting engine 128, or portions thereof. In some implementations, the memory 504 may include one or more of volatile memory and non-volatile memory. For example, the memory 504 may include, but is not limited, to one or more of a dynamic random-access memory (DRAM) device, a static random-access memory (SRAM) device, a discrete memory device (e.g., a PROM, FPROM, ROM), a hard disk drive, an optical disk drive (CD, DVD, Blue-ray™, etc.). It should be understood that the memory 504 may be a single device or may include multiple types of devices and configurations.

The bus 506 can include a communication bus for transferring data between components of a computing device or between computing devices, a network bus system including the network 102 or portions thereof, a processor mesh, a combination thereof, etc. In some implementations, the segmenting engine 128, the configuration engine 126, and/or the modeling platform 118 may cooperate and communicate via a software communication mechanism implemented in association with the bus 506. The software communication mechanism can include and/or facilitate, for example, inter-process communication, local function or procedure calls, remote procedure calls, network-based communication, secure communication, etc.

The communication unit 508 may include one or more interface devices for wired and wireless connectivity with the network 102 and the other entities and/or components of the system 200 including, for example, the user devices 106, the modeling platform 118, the configuration platform 124, etc. For instance, the communication unit 508 may include, but is not limited to, CAT-type interfaces; wireless transceivers for sending and receiving signals using Wi-Fi™; Bluetooth®, cellular communications, etc.; USB interfaces; various combinations thereof; etc. The communication unit 508 may be coupled to the network 102. In some implementations, the communication unit 508 can link the processor 502 to the network 102, which may, in turn, be coupled to other processing systems. The communication unit 508 can provide other connections to the network 102 and other entities of the system 100 using various standard communication protocols, including, for example, those discussed elsewhere herein.

The persistent storage 132 is an information source for storing and providing access to data. In some implementations, the persistent storage 132 may be coupled to the components 502, 504, 508, 118, 128, 126, and/or 108 of the computing device 500 via the bus 506 to receive and provide access to data. The persistent storage 132 can include one or more non-transitory computer-readable mediums for storing the data. In some implementations, the persistent storage 132 may be incorporated with the memory 504 or may be distinct therefrom. In some implementations, the persistent storage 132 may include a database management system (DBMS). For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

Figure 6:
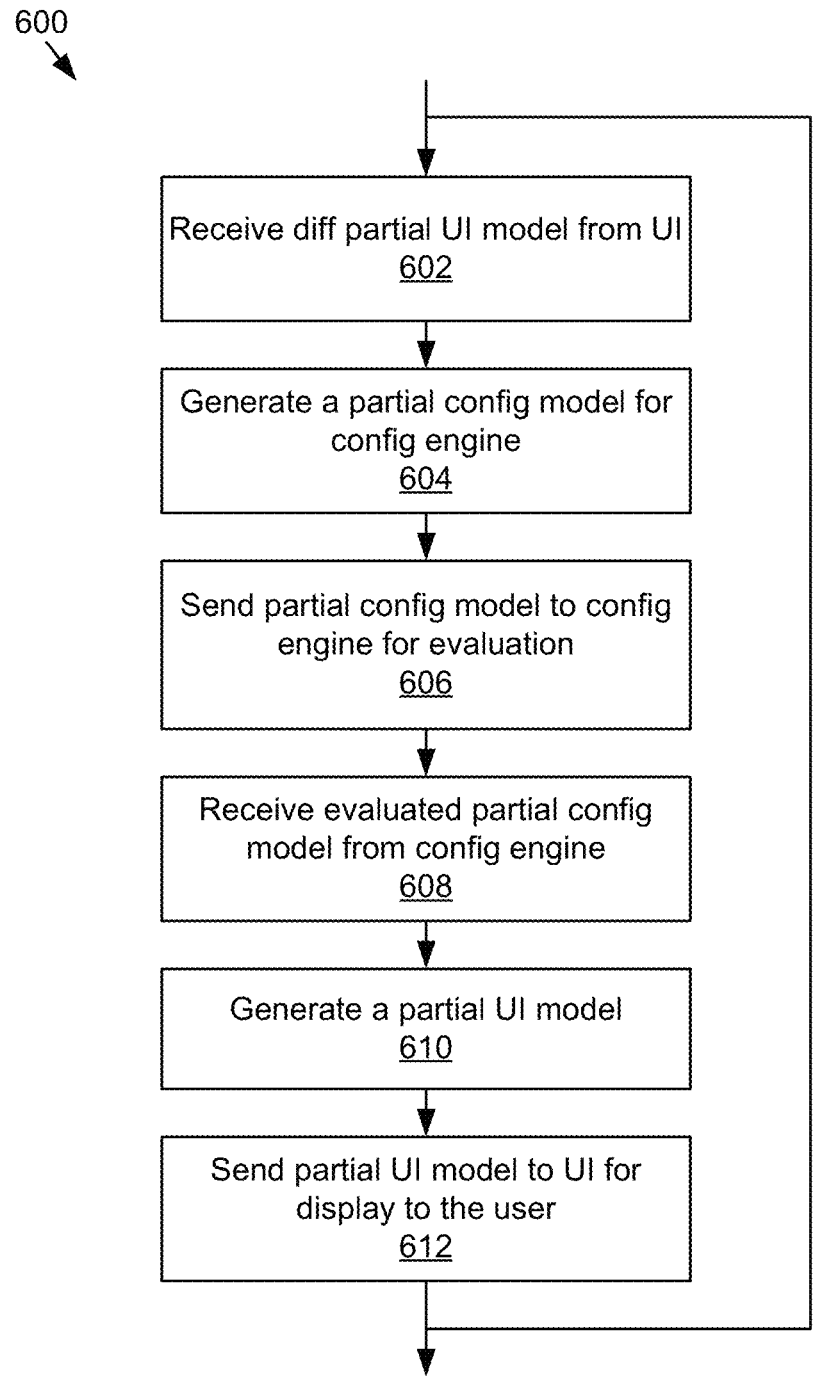
FIG. 6 is a flowchart of an example method for product configuration using partial model data.

Referencing now FIG. 6 in conjunction with FIG. 5, FIG. 6 is a flowchart of an example method 600 for product configuration using partial model data as seen from the viewpoint of the modeling platform 118. The segmenting engine 128 includes a UI model generator 522, an engine model generator 524, a model manager 526, and an error extractor 528.

A user 112 through a user device 106 executing the product configurator UI 108, may choose configuration options and then send a differential partial UI model which is received 602 by the modeling platform 118. The differential partial UI model contains changes that define the configuration input 360 that the engine model generator 524 in the segmenting engine 128 in the modeling platform 118 uses to generate 604 a configuration engine partial model 340 for the configuration engine. The modeling platform 118 then sends 606 the generated partial configuration model to the configuration engine for evaluation. After evaluation in the configuration engine 126, the modeling platform 118 receives 608 the evaluated partial configuration model from the configuration engine and then, using the UI model generator 522 generates 610 a UI partial model 330 and sends 612 the partial UI model to the product configurator UI 108 for display on the user device 106. At that point, a configuration cycle is complete and may repeat as needed.

At various points in the cycle, the modeling platform updates the model 301 or uses the model manager 526 to generate an updated model 301 and saves the updated model 301 to persistent storage 132. In some embodiments, after receiving 602 the differential partial UI model and integrating the differences with the model 301 to update the model, the product configurator UI 108 saves the model 301 to persistent storage 132. In another embodiment, after receiving 608 the evaluated partial configuration model from the configuration engine, the product configurator UI 108 saves the model 301 to persistent storage 132. In another embodiment, after receiving 608 the evaluated partial configuration model from the configuration engine, the product configurator UI 108 parses the evaluated partial configuration model to create an application partial model 350 to send to the application 130.

The user 112 may then interact with the product configurator UI 108 on the user device 106 to configure an item. For example, the product configurator UI 108 may receive configuration input describing a configuration of an item based on the model. When the user 112 interacts with the product configurator UI 108, the product configurator UI 108 may communicate with the modeling platform 118 to verify via the actions 412 that the configuration conforms to the model. For instance, the configuration engine 126 may execute the rule 402 to verify the configuration of the model conforms to the rule 402.

In some cases, the received configuration input describing a configuration of an item may cause issues with other items in the model, and thus the modeling platform 118 may generate errors describing the conflicts. In some cases, the error extractor 528 may extract errors 320 from the evaluated response. The product configurator UI 108 may then use the extracted errors to regenerate the UI model based on the evaluated response to inform the user 112 of the issues caused by the previously received configuration input. In some cases, the model manager 526 may receive a user interface model or an engine model and may generate a full model based on the provided partial model.

In one example, the product configurator UI 108 may send a model difference to the modeling platform 118. This may be performed using an asynchronous data stream, after, for example, a user 112, through a browser, has changed data in a model configuration. The modeling platform 118 may then send the model difference to the configuration engine 126. The configuration engine 126 may then run updates to the model based on the model difference provided to it by the modeling platform 118, and then return the evaluated model to the modeling platform 118. In some instances, the evaluated model is stored in a database in the modeling platform 118 as a JSON file. The modeling platform 118 may also extract errors 320 from the evaluated configuration engine partial model 340 and send the errors 320 to the product configurator UI 108 for presentation to the user 112.

Sending the entire evaluated model from the configuration engine 126 to the modeling platform 118 for extraction of errors is often inefficient since the entire model is sent but certain information, such as an outcome (e.g., errors, results, etc.), is often extracted.

For partial model loading as described herein, the model may be loaded differently by the product configurator UI 108, the modeling platform 118, and the configuration engine 126. In particular, the product configurator UI 108 may only receive and load a UI partial model 330 containing only the data needed for rendering the product configurator UI 108 (e.g., model state and UI layout). This improves UI rendering speed and reduces the memory footprint of the model in the browser. Additionally, the partial model loading into the UI reduces the time required to generate and update the model in memory in the browser.

For the modeling platform 118, chunking the model into smaller pieces may help improve time in processing a model on the server side through serializing and de-serializing the smaller chunks rather that the entire model. In some cases, bigger models may be chunked into smaller pieces (see FIGS. 9A and 9B) and loaded based on usage (e.g., for product configurator UI 108, configuration engine 126, etc.). Accordingly, the segmenting engine 128, described above, may chunk a model into smaller pieces and load the model based on a just-in-time basis.

The reduction of model data with partial loading of models means that less data may need to be transferred from the modeling platform 118 to the configuration engine 126, as well as a reduced state, may need to be instantiated in the configuration engine 126. Loading of partial models is faster than loading of complete model images, and hence reduces computing requirements and ultimately improves response time during validation of configuration models while working on product configuration. In particular, information from models that may not be needed for configuration rules to work properly may be omitted from the model.

Figure 7:
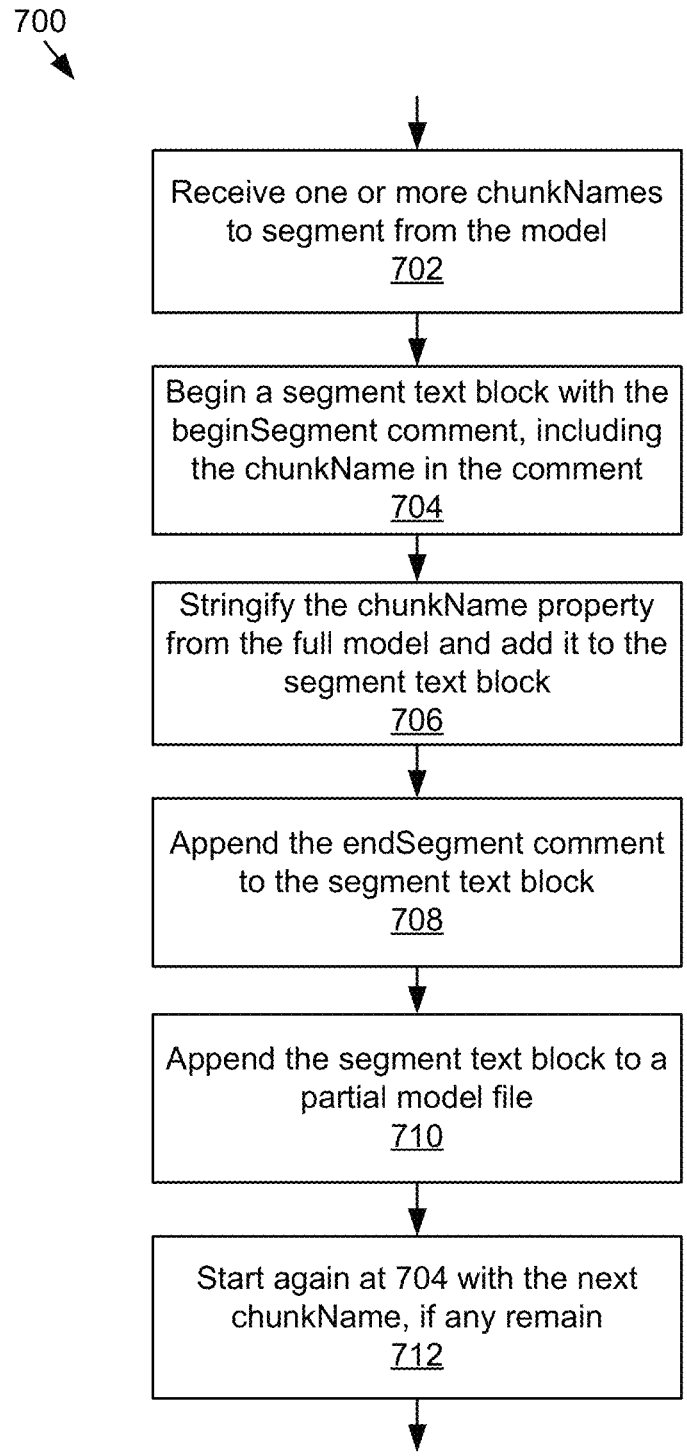
FIG. 7 is a flowchart of an example method for segmenting a product configuration model into discreet chunks (or segments) which can be assembled into partial models.

FIG. 7 illustrates a method 700 for separating a model 301 into discreet segments for later assembly into a partial model, such as the UI partial model 330. In some embodiments, the method 700 receives one or more chunk names to segment from the model 702. The method then begins a text block for the segment by adding a comment of a certain format 704 (see FIG. 10 for a specific example), in some embodiments, the comment includes the currently-being-processed chunk name received in 702. The method then stringifies (converts from native format into a text format) the property (identified by the chunk name) from the model 706 and adds the stringified property to the text block. Then, in this embodiment, the method 700 appends an end comment segment 708. Finally, the method appends the segment text block to a partial model file (in memory, or on persistent storage) 710. Both the begin comment and the end comment are optional but serve to make each chunk more identifiable and more clearly delineate the separate chunks in a file. If there are still chunk names received in 702 remaining to be extracted 712 begin again at 704 with the next chunk name.

FIGS. 8A and 8B illustrate example model pseudo code 800 and 820 of a model in JSON format with various sections redacted for brevity. The model pseudo code 800 and 820 illustrate an example structure of the model 301 and minimally represent the content of the model. The first portion of the listing of model pseudo code 800 illustrates the first portion of the model, and the second portion of the model pseudo code 820 is broken out into a second column for readability. The example pseudo code may be used by the segmenting engine 128 to segment a model 301 into discrete chunks as illustrated in FIG. 3 without extraneous information. In some embodiments, the model pseudo code 800 and 820 may be processed by the segmenting engine 128 into the chunked model pseudo code 900 and 920 in FIGS. 9A and 9B. For example, the UI chunk 902 at the beginning of pseudo code 900 is extracted from the UI section 802 near the beginning of an example model's 301 pseudo code 800. Similarly, sections of the model 801, 804, 806, 808, 822, and 824 are extracted out of the model 301 into chunks 926, 924, 930, 922, 904 and 928, respectively.

FIG. 10 shows example pseudo code 1000 to segment a model in the "toSegment Model" function 1010, which cycles through a model looking for keyNames (such as "UI" from FIG. 7 and FIGS. 8A and 8B) and creates discrete chunks using the "getSegment" function 1020 as shown. Using an algorithm based on the pseudo code 1000 on a model based on the model pseudo code 800 and 820 would segment the model into chunks similar to those shown in the chunked model pseudo code 900 and 920.

FIG. 11 shows example pseudo code 1100 for extracting partial models from the chunked model pseudo code 900 and 920. The "getModelForUI" function 1110, for example, extracts a set of chunks from the chunked model pseudo code 900 and 920, and builds a UI partial model 330 using the "buildJSONFromChunks" function 1130. The "getModelForEngine" function 1120, for example, extracts a set of chunks from the chunked model pseudo code 900 and 920, and builds a configuration engine partial model 340 using the "buildJSONFromChunks" function 1130. In some embodiments, the acts shown in the pseudo code 1100 are part of the model manager 526, which is a model manager that can retrieve, segment, update, and save a model 301.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   receiving, via a product configurator user interface, a configuration input configuring one or more aspects of a configurable model;
   sending a difference model to a configuration engine, the difference model based on the configuration input changing the configurable model;
   generating a first partial structured data set for evaluation by the configuration engine based on the difference model from the configuration input and a segmented data model associated with the configurable model, the first partial structured data set including a first subset of segments from the segmented data model;
   sending the first partial structured data set to the configuration engine for evaluation;
   evaluating the first partial structured data set to determined changes to the configurable model based one the first partial structured data set; and
   receiving an evaluated instance of the first partial structured data set from the configuration engine, the evaluated instance of the first partial structured data set reflecting an outcome of a configuration of the one or more aspects of the configurable model.

2. The computer-implemented method of claim 1, further comprising:
   generating a second partial structured data set based on the segmented data model and the outcome of the configuration received from the configuration engine, the second partial structured data set including a second subset of segments from the segmented data model that are different from the first subset of segments; and
   sending the second partial structured data set to the product configurator user interface.

3. The computer-implemented method of claim 2, further comprising:
   loading, at a computing device displaying the product configurator user interface, the second partial structured data set in memory; and
   updating, via the product configurator user interface, the configurable model to highlight the outcome based on the loaded second partial structured data set.

4. The computer-implemented method of claim 2, wherein:
   the outcome includes one or more results produced by an evaluation of the configuration of the configurable model by the configuration engine, and one or more errors produced by the evaluation of the configuration of the configurable model by the configuration engine; and
   the second partial structured data set includes a facts segment including the configuration input, a results segment including the one or more results and the one or more errors, and a subset of other segments from the segmented data model.

5. The computer-implemented method of claim 2, further comprising:
   parsing an error segment from the evaluated instance of the first partial structured data set, the error segment reflecting one or more errors identified by the configuration engine during an evaluation of the first partial structured data set; and
   highlighting, in the product configurator user interface, the one or more errors described by the error segment, wherein the second partial structured data set includes the error segment.

6. The computer-implemented method of claim 2, further comprising:

determining the first partial structured data set and the second partial structured data set based on an intended recipient.

7. The computer-implemented method of claim 6, wherein
responsive to the intended recipient being the product configurator user interface, the second subset of segments from the segmented data model includes segments required by the product configurator user interface to render the configurable model for display, and
responsive to the intended recipient being the configuration engine, the first subset of segments from the segmented data model includes segments required by the configuration engine to evaluate the configurable model, and
responsive to the intended recipient being a customer relationship management (CRM) platform, a third partial structured data set includes at least one segment required by the CRM platform.

8. The computer-implemented method of claim 1, further comprising:
receiving, at the configuration engine, the first partial structured data set for evaluation;
loading the first partial structured data set into memory;
evaluating, at the configuration engine, the loaded first partial structured data set; and
sending the evaluated instance of the first partial structured data set from the configuration engine.

9. A system comprising:
a product configurator user interface that displays a configurable model and receives configuration input configuring the configurable model;
a modeling platform comprising a segmenting engine, the modeling platform being coupled via a network to the product configurator user interface, the segmenting engine of the modeling platform being executable to perform operations comprising:
receiving, from the product configurator user interface, the configuration input configuring one or more aspects of the configurable model,
sending a difference model to a configuration engine, the difference model based on the configuration input changing the configurable model; and
generating a first partial structured data set for evaluation by the configuration engine based on the difference model from the configuration input and a segmented data model associated with the configurable model, the first partial structured data set including a first subset of segments from the segmented data model; and
a configuration engine coupled for communication with the modeling platform, the modeling platform being executable to perform operations comprising:
sending the first partial structured data set to the configuration engine for evaluation,
evaluating the first partial structured data set to determined changes to the configurable model based one the first partial structured data set; and
receiving an evaluated instance of the first partial structured data set from the configuration engine, the evaluated instance of the first partial structured data set reflecting an outcome of the configuration of one or more aspects of the configurable model.

10. The system of claim 9, wherein the operations of the segmenting engine further comprise:
generating a second partial structured data set based on the segmented data model and the outcome of the configuration received from the configuration engine, the second partial structured data set including a second subset of segments from the segmented data model that are different from the first subset of segments; and
sending the second partial structured data set to the product configurator user interface.

11. The system of claim 10, wherein the product configurator user interface:
displays the second partial structured data set; and
highlights the outcome based on the displayed second partial structured data set.

12. The system of claim 10, wherein:
the outcome includes one or more results produced by an evaluation of the configuration of the configurable model by the configuration engine, and one or more errors produced by the evaluation of the configuration of the configurable model by the configuration engine; and
the second partial structured data set includes a facts segment including the configuration input, a results segment including the one or more results and the one or more errors, and a subset of other segments from the segmented data model.

13. The system of claim 10, wherein the operations of the segmenting engine further comprise:
parsing an error segment from the evaluated instance of the first partial structured data set, the error segment reflecting one or more errors identified by the configuration engine during an evaluation of the first partial structured data set, the modeling platform highlighting one or more errors described by the error segment, the second partial structured data set includes the error segment.

14. The system of claim 10, wherein the modeling platform is further configured to:
determine the first partial structured data set and the second partial structured data set based on an intended recipient.

15. The system of claim 14, wherein
responsive to the intended recipient being the product configurator user interface, the second subset of segments from the segmented data model includes segments required by the product configurator user interface to render the configurable model, and
responsive to the intended recipient being the configuration engine, the first subset of segments from the segmented data model includes segments required by the configuration engine to evaluate the configurable model, and
responsive to the intended recipient being a customer relationship management (CRM) platform, a third partial structured data set includes at least one segment required by the CRM platform.

16. The system of claim 9, wherein the operations of the configuration engine further comprise:
receiving the first partial structured data set for evaluation;
evaluating, the first partial structured data set; and
sending an evaluated instance of the first partial structured data set, the evaluated instance of the first partial structured data set reflecting an outcome of the configuration of the one or more aspects of the configurable model.

17. A computer-implemented method comprising:
receiving, via a product configurator user interface, configuration input configuring one or more aspects of a configurable model;

sending a difference model to a configuration engine, the difference model based on the configuration input changing the configurable model;

generating a first partial structured data set for evaluation by the configuration engine based on the difference model from the configuration input and a segmented data model associated with the configurable model;

sending the first partial structured data set to the configuration engine for evaluation;

evaluating the first partial structured data set to determined changes to the configurable model based one the first partial structured data set;

receiving an evaluated instance of the first partial structured data set from the configuration engine;

generating a second partial structured data set based on the segmented data model and the outcome of the configuration received from the configuration engine, the second partial structured data set omitting at least one rule information segment used by the configuration engine to evaluate the configurable model; and sending the second partial structured data set to the product configurator user interface.

18. The computer-implemented method of claim 17, wherein the evaluated instance of the first partial structured data set reflects an outcome of the configuration of the one or more aspects of the configurable model.

19. The computer-implemented method of claim 17, wherein the second partial structured data set includes a subset of segments from the segmented data model that are different from a subset of segments comprising the first partial structured data set.

20. The computer-implemented method of claim 19, wherein the first partial structured data set omits at least one user interface-related segment from the segmented data model that is included in the subset of segments comprising the second partial structured data set and is used by the product configurator user interface to render the configurable model.

* * * * *

UNITED STATES PATENT AND TRADEMARK OFFICE
CERTIFICATE OF CORRECTION

PATENT NO. : 10,891,115 B2  
APPLICATION NO. : 16/716494  
DATED : January 12, 2021  
INVENTOR(S) : Shanahin et al.

Page 1 of 1

It is certified that error appears in the above-identified patent and that said Letters Patent is hereby corrected as shown below:

In the Claims

In Column 16, Line 16, please replace "determined" with --determine--

In Column 16, Line 17, please replace "one" with --on--

In Column 17, Line 56, please replace "determined" with --determine--

In Column 17, Line 57, please replace "one" with --on--

In Column 19, Line 10, please replace "determined" with --determine--

In Column 19, Line 11, please replace "one" with --on--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*